No. 641,724. Patented Jan. 23, 1900.
F. M. PETERS.
CRACKER OR BISCUIT MACHINE.
(Application filed July 11, 1898.)
(No Model.) 2 Sheets—Sheet 1.
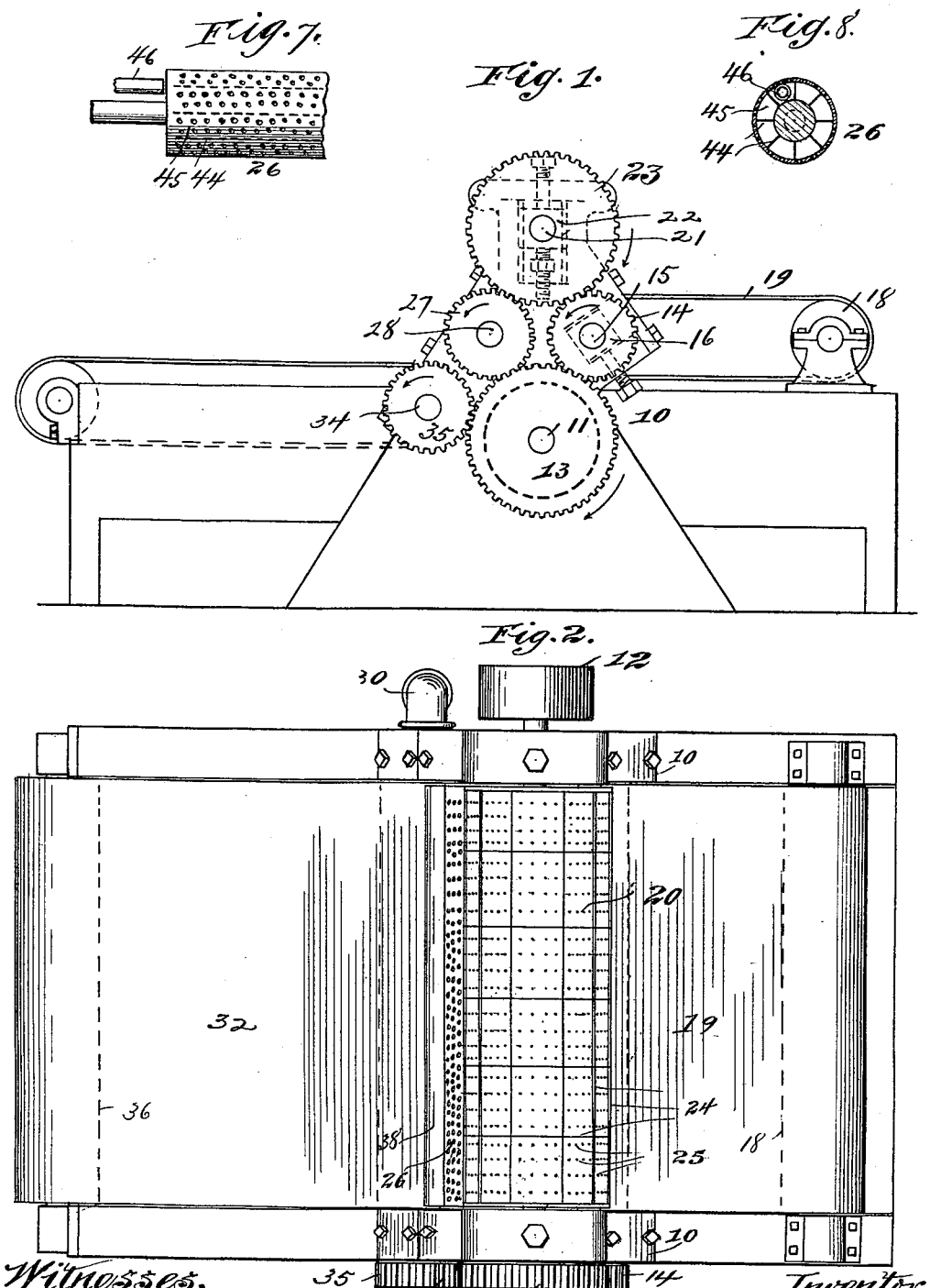

No. 641,724. Patented Jan. 23, 1900.
F. M. PETERS.
CRACKER OR BISCUIT MACHINE.
(Application filed July 11, 1898.)
(No Model.) 2 Sheets—Sheet 2.
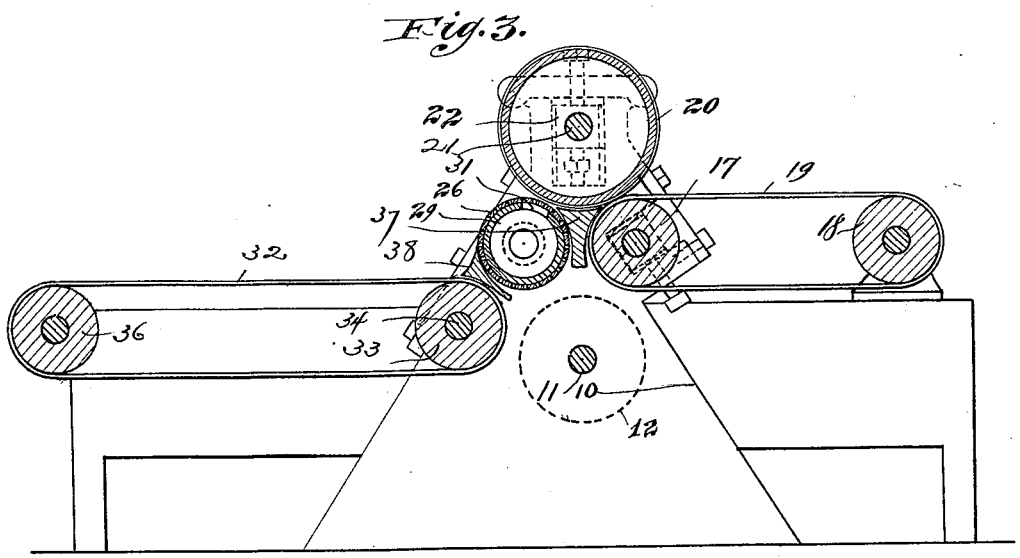
Fig. 3.
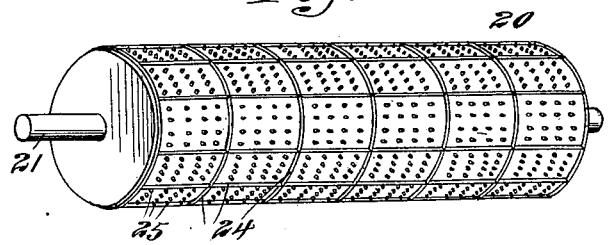
Fig. 4.
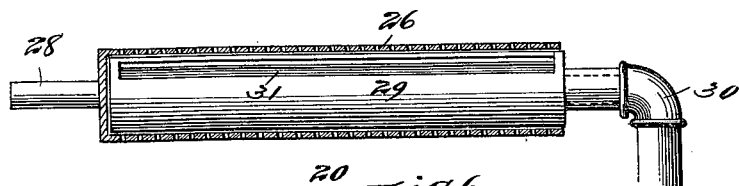
Fig. 5.
Fig. 6.
Witnesses, Inventor,
Frank M. Peters,
By Offield, Towle & Linthicum,
Attys.

UNITED STATES PATENT OFFICE.

FRANK M. PETERS, OF CHICAGO, ILLINOIS.

CRACKER OR BISCUIT MACHINE.

SPECIFICATION forming part of Letters Patent No. 641,724, dated January 23, 1900.

Application filed July 11, 1898. Serial No. 685,698. (No model.)

*To all whom it may concern:*

Be it known that I, FRANK M. PETERS, of Chicago, in the county of Cook and State of Illinois, have invented certain new and useful Improvements in Cracker or Biscuit Machines, of which the following is a specification.

This invention relates to machines for cutting or molding crackers or biscuits from dough, and has for its object to provide a simple and effective mechanism whereby the dough may be rapidly cut or molded into the desired shape and be stripped from the cutting or molding device in a simple and effective manner.

My invention is preferably embodied in a machine in which the cutting and stripping devices are of a rotary character, so that the operation of these parts is continuous and the dough is not arrested during its movement through the machine.

To these and other ends my invention consists in certain novel features, which I will now proceed to describe and will then particularly point out in the claims.

In the accompanying drawings, Figure 1 is a side elevation of a machine embodying my invention; Fig. 2, a plan view of the same; Fig. 3, a central vertical longitudinal sectional view; Fig. 4, a detail perspective view of the cutting or molding cylinder; Fig. 5, a central longitudinal sectional view of the air-suction device; Fig. 6, a detail elevation, partly in section, illustrating a modification.
Fig. 7 is an elevation of a modified construction of the rotary stripping-cylinder, and Fig. 8 a transverse sectional view of the same.

Referring first to the construction shown in Figs. 1 to 5 of the drawings, 10 represents a suitable supporting-frame, in which is mounted a driving-shaft 11, to which power is applied by any suitable means—as, for instance, a belt passing over a pulley 12 on said shaft. This shaft is also provided with a gear 13, which meshes with a gear 14 on a shaft 15, mounted in boxes 16, which are adjustably supported in the frame 10. The shaft 15 carries a roller 17, around which and around a similar idle roller 18 there passes an endless belt or apron 19, by means of which the dough is carried to the cutting or molding mechanism. This latter consists of a cylinder 20, carried on a shaft 21, mounted in boxes 22, which are vertically adjustable in the frame 10, said shaft being provided with a gear 23, which meshes with the gear 14 and is driven thereby. The cylinder 20 has its outer surface provided with suitable molds or cutters, whereby when the dough is impressed against the same it will be molded or divided into parts of the desired shape and size. In the present instance I have shown a cylinder which is adapted for the molding or cutting of what are known as "soda crackers," the surface of the cylinder being provided with knives or ribs 24, arranged to form rectangles thereon, and with pins 25 within each rectangle, so formed as to make the apertures or perforations in the cracker. It is obvious, of course, that the surface of the cylinder may be constructed in any desired way, according to the size and configuration of the crackers or biscuits which it is desired to mold or cut. The actual molding or cutting occurs at the point where the cylinder 20 and roller 17 most closely approach each other, the dough being pressed against the said cylinder by the said roller while lying upon the belt or apron 19 and the roller being adjustable toward and from the cylinder in order to maintain the proper distance between the two and adjust the same to the cutting of crackers or biscuits of different thicknesses.

The dough after being cut or molded adheres to the cutting or molding cylinder and is carried thereby to the doffing or stripping mechanism, whereby the cut or molded dough is stripped or withdrawn from the cutting or molding cylinder. This doffing or stripping mechanism consists of an air-suction device, which in the construction shown in Figs. 1 to 5 of the drawings comprises an apertured or perforated cylinder 26, which is driven by a pinion 27 on its shaft 28, said pinion 27 meshing with the gears 13 and 23, as shown in Fig. 1 of the drawings. The cylinder 26 is hollow, and there fits snugly therein a fixed hollow cylinder 29, on which the cylinder 26 turns. The cylinder 29 is connected by means of a pipe 30 with any suitable means, such as a fan or pump, for exhausting the air from the interior thereof. Said cylinder 29 is provided with a longitudinally-extending slot 31, and the cylinder 29 is adapted to be radially adjusted, so as to vary the position of said slot 31 relatively to the surface of the cutting or molding cylinder 20. As the dough after being cut and adhering to the cutting or molding cylinder 20 is carried by this latter, it comes opposite that portion of the perforated cylinder 26 which lies over the slot 31, and the air-suction draws the dough away from the cutting or molding cylinder and causes it to adhere to the doffer or air-suction device, so that it is stripped from the cutting or molding cylinder and carried away therefrom by the said doffer or air-suction device. As soon, however, as that portion of the perforated outer cylinder to which the dough first adheres has passed beyond the slot 31 the air-suction ceases to affect the dough, which is then released from the doffer-cylinder in order that it may be delivered from the machine. For this purpose I employ an endless belt or apron 32, which passes around a roller 33, mounted on a shaft 34, having a gear wheel or pinion 35, which meshes with the gear 13. The other end of the belt or apron 32 passes around an idle roller 36.

In order to guide and support the dough, I employ beneath the cutting or molding cylinder 20 and between the belt 19 and stripping mechanism a plate 37, which has its forward edge extending over the belt sufficiently close to the same to insure the removal of any dough which may tend to adhere to said belt. I also employ between the stripping mechanism and the belt 32 a similar plate 38, which has it forward edge arranged close to the outer surface of the perforated cylinder 26, so as to insure the release of the dough therefrom, the plate serving to guide it onto the belt 32. The crackers after having been cut or molded are taken from the belt 32 by means of a peel or in any other suitable manner.

The operation of the machine will be readily understood from the foregoing description. The dough is placed upon the belt 19 and carried between the cutting or molding cylinder and the roller 17, where it is cut or molded into the desired shape. The dough adhering to the cylinder 20 is carried to the air-suction device, by which it is stripped from the cylinder and delivered to the belt 32, by which it is carried from the machine. The operation is continuous, automatic, and rapid, while the machine is simple in construction and free from complication of parts, and is therefore inexpensive of construction and not liable to get out of order.

The cutting or molding cylinder is readily removable from the machine, so that a cylinder of any desired shape or construction may be substituted therefor in order to cut or mold crackers or biscuits of any desired form. The adjustment of the cylinder 20 and of the roller 17 permits the machine to be adapted for varying conditions and thicknesses of the dough, and the adhesion and release of the dough from the stripper may be adjusted by so rotating the cylinder 29 as to bring the slot 31 into the desired position for effecting these operations at the proper point.

I have hereinbefore described and shown in Figs. 1 to 5 of the drawings a machine embodying my invention in one form. It is obvious, however, that various modifications in the construction specified may be made without departing from the principle of my invention. For instance, although I prefer to embody my invention in a rotary machine, yet it is obvious that the main feature thereof—to wit, the air-suction stripping mechanism—may be applied to cracker or biscuit machines in which a reciprocating cutting or molding mechanism is employed instead of a rotary one. Moreover, although I prefer the particular form of perforated cylinder mounted on a non-rotating and slotted air-suction box or cylinder the perforated adhesive surface may be in the form of a continuous or endless belt of perforated metal or other suitable material.

I have shown in Fig. 6 an illustration of a construction embodying my invention in a simple form of this character, in which a rotary cutting or molding cylinder 20 is employed in conjunction with a single endless belt or apron 39, made of perforated metal or other foraminous material, passing over rollers 40 and 41, which are suitably actuated in any desired manner and traveling under the cutting and molding cylinder 20. Beneath this apron and immediately under the cylinder 20 is an air-suction box 42, having in its upper portion a slot 43 and being connected by a pipe or hose 44 to some suitable means for exhausting the air from the interior of said suction-box. It will be seen that in this construction a single belt or apron carries the dough to the cutting or molding cylinder and out of the machine, the dough being cut or molded between the cylinder 20 and the top of the suction-box 42 as it is carried between these two parts by the movement of the belt and being stripped from the cylinder as it passes over the slot 43, where the air-suction causes it to adhere to the perforated belt or apron, from which it is released as soon as it passes beyond the point where the slot 43 makes the air-suction operative. It is, moreover, obvious that a suction device such as that shown in Fig. 6 may be employed in conjunction with a reciprocating cutter as well as with the rotary cutter shown in said figure and just described, it being of course necessary to impart a step-by-step movement to the suction device in case it is employed in connection with a reciprocating cutter whatever the form of the suction device may be.

The precise form of the rotary stripping mechanism may also be varied as to its details. For instance, in the form shown in Figs. 1 to 5 a plurality of perforations may be substituted for the slot 31 or this latter may be non-continuous. In another form which I have devised and which is shown in Figs. 7 and 8 of the drawings the fixed internal cylinder 29 is dispensed with and the revolving perforated cylinder 26 is divided by means of partitions 44 into a plurality of internal chambers 45, which successively register with a fixed exhaust-pipe 46 as the cylinder rotates, so that each chamber and the corresponding portion of the stripping-cylinder become operative for a brief period only at the proper time and point for stripping the dough from the cutter.

I am aware that it has been proposed to employ an air-blast in dislodging or stripping the dough from the cutters in cracker or biscuit machinery and also for forcing dough out through molds, shapers, or formers. The use of an air-blast is not practical for discharging crackers or biscuit of any considerable size, for the reason that a blast of air will act upon that portion of the cracker or biscuit which happens to be the least firmly attached and will have a tendency to detach a corner or edge of the biscuit or cracker, and when this occurs the air will rush out, leaving the remainder of the cracker attached. In other words, the force of the air-blast is likely to be neutralized before the article is detached, while with a suction device the suction bears equally upon the entire surface of the cracker and positively and certainly detaches it. It will also be observed that the suction device has a movement or travel relative to the cutting or molding device and serves not only to strip the dough from the cutter, but also to convey it away therefrom.

Without limiting myself strictly to the details hereinbefore described, and shown in the drawings, I claim—

1. In a cracker or biscuit machine, the combination, with a cutting or molding device, of a revolving air-suction device for stripping and conveying away the dough from the cutting or molding device, substantially as described.

2. In a cracker or biscuit machine, the combination, with a revolving cutting or molding cylinder, of a revolving air-suction device for stripping and conveying away the dough from the cutting or molding cylinder, substantially as described.

3. In a cracker or biscuit machine, the combination, with a revolving cutting or molding cylinder, of an air-suction device for stripping and conveying the dough therefrom, comprising a revolving perforated cylinder and means for exhausting the air from the interior thereof, substantially as described.

4. In a cracker or biscuit machine, the combination, with a rotary cutting or molding cylinder, of a rotary perforated cylinder and an inner non-revolving cylinder, provided with a longitudinal slot, and means for exhausting the air from the said inner cylinder, whereby the dough may be stripped from the cutter-cylinder and carried by the perforated cylinder away from the cutter, substantially as described.

5. In a cracker or biscuit machine, the combination, with a revolving cutting or molding cylinder and means for conveying a sheet of dough thereto, of a revolving air-suction device movable in a path adjacent to the circumference of the revolving cutting-cylinder and adapted for stripping the dough from the cutting-cylinder and for conveying it away from the cylinder, substantially as described.

6. In a cracker or biscuit machine, the combination, with an endless belt or apron and rollers over which it passes, of a cutting or molding cylinder coöperating with said belt and one of its rollers, a revolving perforated stripper provided with means for exhausting the air from its interior to strip the dough from the cutting or molding cylinder, and an endless belt or apron to receive the dough from said stripper, substantially as described.

FRANK M. PETERS.

Witnesses:
FREDERICK C. GOODWIN,
IRVINE MILLER.